United States Patent
Slama

(10) Patent No.: US 11,353,339 B2
(45) Date of Patent: Jun. 7, 2022

(54) APPARATUS FOR MEASURING THE ANGULAR POSITION OF A SHAFT

(71) Applicant: Infineon Technologies AG, Neubiberg (DE)

(72) Inventor: Peter Slama, Klagenfurt (AT)

(73) Assignee: Infineon Technologies AG

( * ) Notice: Subject to any disclaimer, the term of this patent is extended or adjusted under 35 U.S.C. 154(b) by 0 days.

(21) Appl. No.: 16/990,467

(22) Filed: Aug. 11, 2020

(65) Prior Publication Data

US 2021/0048317 A1 Feb. 18, 2021

(30) Foreign Application Priority Data

Aug. 16, 2019 (DE) .......................... 102019122046.7

(51) Int. Cl.
*G01D 5/245* (2006.01)
*H02K 11/215* (2016.01)

(52) U.S. Cl.
CPC ........... *G01D 5/245* (2013.01); *H02K 11/215* (2016.01)

(58) Field of Classification Search
CPC ... G01D 5/12–2525; G01P 1/02; G01P 1/026; G01P 3/42; G01P 3/44; G01P 3/48; G01P 3/481; G01P 3/487; H02K 11/20; H02K 11/21; H02K 11/215
See application file for complete search history.

(56) References Cited

U.S. PATENT DOCUMENTS

| | | | |
|---|---|---|---|
| 10,476,341 B2 | 11/2019 | Pondelek et al. | |
| 10,704,926 B2 | 7/2020 | Aichriedler et al. | |
| 2002/0135497 A1* | 9/2002 | Kimura | G01D 5/145 340/870.31 |
| 2011/0018528 A1* | 1/2011 | Semineth | E05F 15/697 324/207.25 |
| 2011/0080162 A1* | 4/2011 | Steinich | G01B 7/30 324/207.25 |
| 2016/0061637 A1* | 3/2016 | Aichriedler | G01D 11/24 324/207.12 |
| 2016/0265940 A1* | 9/2016 | Burgdorf | H02K 11/215 |
| 2017/0254671 A1* | 9/2017 | Aichriedler | G01D 5/2013 |

FOREIGN PATENT DOCUMENTS

| | | | | |
|---|---|---|---|---|
| DE | 10212859 A1 | 10/2002 | | |
| DE | 102017104206 A1 | 9/2017 | | |
| DE | 102017212039 A1 * | 1/2019 | ............. | G01D 5/145 |
| DE | 102017212039 A1 | 1/2019 | | |
| DE | 102015002562 A1 | 2/2019 | | |
| DE | 102017216664 A1 | 3/2019 | | |
| EP | 3109599 A1 | 12/2016 | | |

* cited by examiner

*Primary Examiner* — Huy Q Phan
*Assistant Examiner* — David B Frederiksen
(74) *Attorney, Agent, or Firm* — Design IP

(57) ABSTRACT

An apparatus for measuring the angular position or the rotational movement of a shaft is described below. According to one exemplary embodiment, the apparatus has a first housing part and also a shaft which is arranged in the first housing part and can rotate about a rotation axis. The shaft has a bore which extends along the rotation axis from an end shaft of the shaft into the shaft. The apparatus further includes a magnet unit with at least one permanent magnet which is arranged within the bore and is fastened to the shaft, a second housing part with a projection which extends along the rotation axis into the bore, and also a magnetic field sensor element which is arranged in the interior of the projection of the second housing part.

14 Claims, 4 Drawing Sheets

APPARATUS FOR MEASURING THE ANGULAR POSITION OF A SHAFT

FIELD

The present description relates to the field of angle measurement systems which can be used, for example, for measuring the angular position of shafts.

BACKGROUND

Measurement systems for measuring the angular position of the motor shaft are required, for example, for controlling electric motors. Measurement systems of this kind are often based on detecting a rotating magnetic field and usually contain (amongst other things) one or more permanent magnets which are connected to the shaft and therefore rotate together with said shaft, and also one or more magnetic field sensors for detecting the resulting magnetic field. One object on which the invention is based can be considered that of designing existing sensor systems more efficiently (for example in respect of costs, assembly, number of parts, reduction of installation space or the like).

SUMMARY

The abovementioned object is achieved by an apparatus as claimed in claim 1 or 8. Various embodiments and further developments are the subject matter of the dependent claims.

An apparatus for measuring the angular position or the rotational movement of a shaft is described below. According to one exemplary embodiment, the apparatus has a first housing part and also a shaft which is arranged in the first housing part and can rotate about a rotation axis. The shaft has a bore which extends along the rotation axis from an end side of the shaft into the shaft. In the case of a hollow shaft, said bore is a passage hole. The apparatus further includes a magnet unit with at least one permanent magnet which is arranged within the bore and is fastened to the shaft, a second housing part with a projection which extends along the rotation axis into the bore, and also a magnetic field sensor element which is arranged in the interior of the projection of the second housing part.

The invention furthermore describes a drive apparatus with an electric motor. According to one exemplary embodiment, the apparatus has an electric motor which is arranged in a first housing part and has a motor shaft which can rotate about a rotation axis and has a bore which extends along the rotation axis from an end side of the shaft. The apparatus further has a magnet unit with at least one permanent magnet which is arranged within the bore and is fastened to the shaft, and also an actuation unit which is arranged in a housing which has a projection which extends along the rotation axis into the bore. An electronic circuit for actuating the electric motor is arranged in the actuation unit, and a magnetic field sensor element is arranged in the interior of the projection, which magnetic field sensor element is coupled to the electronic circuit for actuating the electric motor.

BRIEF DESCRIPTION OF THE DRAWINGS

Exemplary embodiments are explained in more detail below with reference to drawings. The illustrations are not necessarily true to scale and the exemplary embodiments are not limited only to the aspects illustrated. Rather, importance is attached to the principles on which the exemplary embodiments are based. In respect of the drawings.

DETAILED DESCRIPTION

Figure 1:
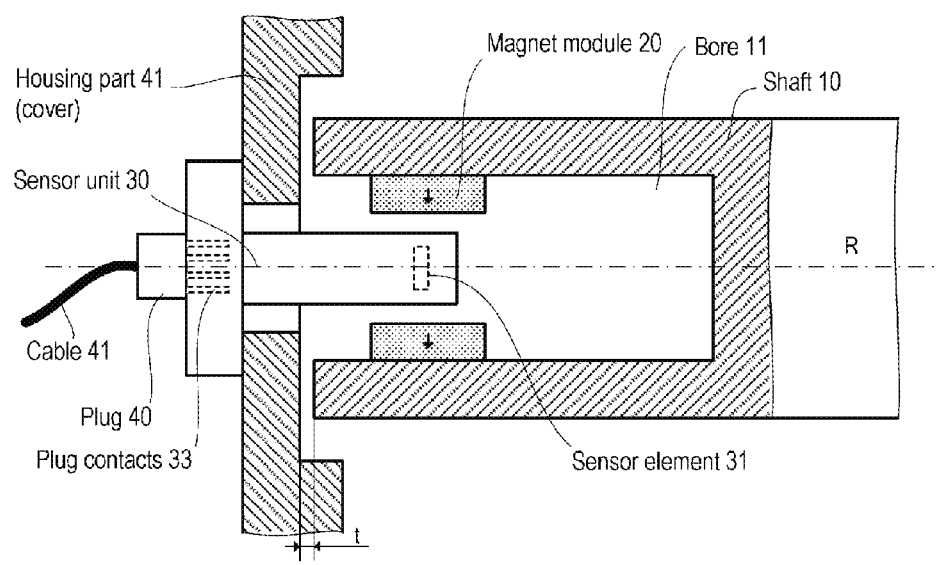
FIG. 1 illustrates an example of a magnetic sensor which is arranged at the end of a shaft in a central axial bore of the shaft; the sensor can be pushed into the central axial bore through an opening in the housing.

FIG. 1 describes a sensor system, which is coupled to a shaft, for measuring the angular position and/or the angular velocity of a shaft which is mounted in a housing, in particular of a motor shaft of an electric motor. The electric motor can be, for example, a permanent-magnet synchronous motor (PMSM) which is often also referred to as a brushless DC motor. The design of motors of this kind is known in principle and therefore not illustrated in FIG. 1 in order to keep the illustration simple.

FIG. 1 shows a shaft 10 which is arranged in a housing and is mounted such that it can rotate about a rotation axis R (for example the motor shaft of an electric motor). The shaft 10 has an axial bore 11, i.e. the bore 11 extends along the rotation axis R starting from the end side of the shaft 10 into the shaft 10. The bore 11 can be a blind hole or a passage hole. In the case of a passage hole, the shaft 10 is a hollow shaft. A magnet unit 20 is arranged within the bore 11 and is fastened to the shaft 10 and therefore rotates together with said shaft. The magnet unit 20 has at least one permanent magnet. Only a portion of the housing, specifically a housing cover 41 which lies approximately in a plane which is perpendicular to the rotation axis, is illustrated in FIG. 1. A small gap (gap width t) can be situated between the end side of the shaft 10 and the inner side of the housing cover. Various designs of the magnet unit 20 are known per se. For the examples described here, the specific implementation of the magnet unit 20 is known per se and therefore will not be discussed further here.

The housing cover 41 has a central opening through which a sensor unit 30 can be inserted. A portion of the sensor unit 30 has an elongate shape (for example a cylindrical shape). This portion lies approximately on the rotation axis R and is introduced into the bore 11 when the sensor unit 30 passes through the opening in the housing cover 41. The sensor unit 30 can be fastened to the housing cover 41. By way of example, the sensor unit is adhesively bonded or fastened by means of screws to the housing cover 41.

One or more sensor elements 31 are located in the interior of the sensor unit 30, which sensor elements are sensitive to the magnetic field which is generated by the magnet unit 21 and rotates together with the shaft 10. Furthermore, the sensor unit 30 can contain sensor electronics for actuating the sensor elements 31 and for (pre-)processing the sensor signals (but this does not necessarily have to be the case). In the example illustrated in FIG. 1, the sensor unit 30 has a socket with electrical contacts 33 which render possible a plug connection to a plug 40. A cable 41 can be connected to the sensor electronics in the interior of the sensor unit 30 with the aid of the plug 40. The sensor system comprising the sensor unit 30 and the magnet unit 20 which rotates together with the shaft 10 allows measurement of the angular position of the shaft 10. The angular velocity and/or the angular acceleration of the shaft can be derived from the angular positions measured.

Figure 2:
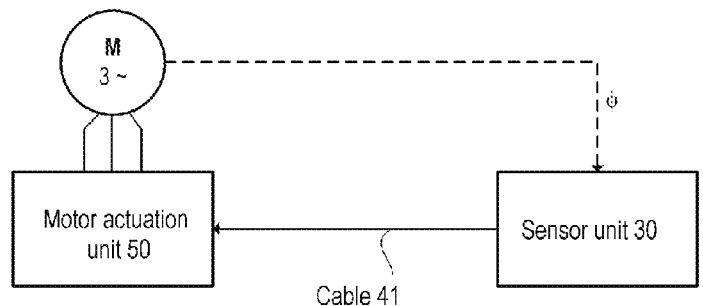
FIG. 2 is a block diagram which shows, by way of example, an actuation unit for an electric motor, for example a converter for a brushless DC motor.

The block diagram in FIG. 2 schematically illustrates an electric motor M with a sensor unit 30 for measuring the angular position φ of the motor shaft. The sensor unit 30 is connected to the actuation unit 50, which contains the electronics for actuating the electric motor M, via the cable 41. The electronics for actuating the electric motor M contain, for example, a converter (for example a 3-phase inverter), gate driver circuits for actuating the power transistors which are contained in the converter, a microcontroller for generating the control signals for the gate driver circuits (amongst other things, based on the information, which is received from the sensor unit 30, about the angular position φ of the motor shaft), etc.

Figure 3:
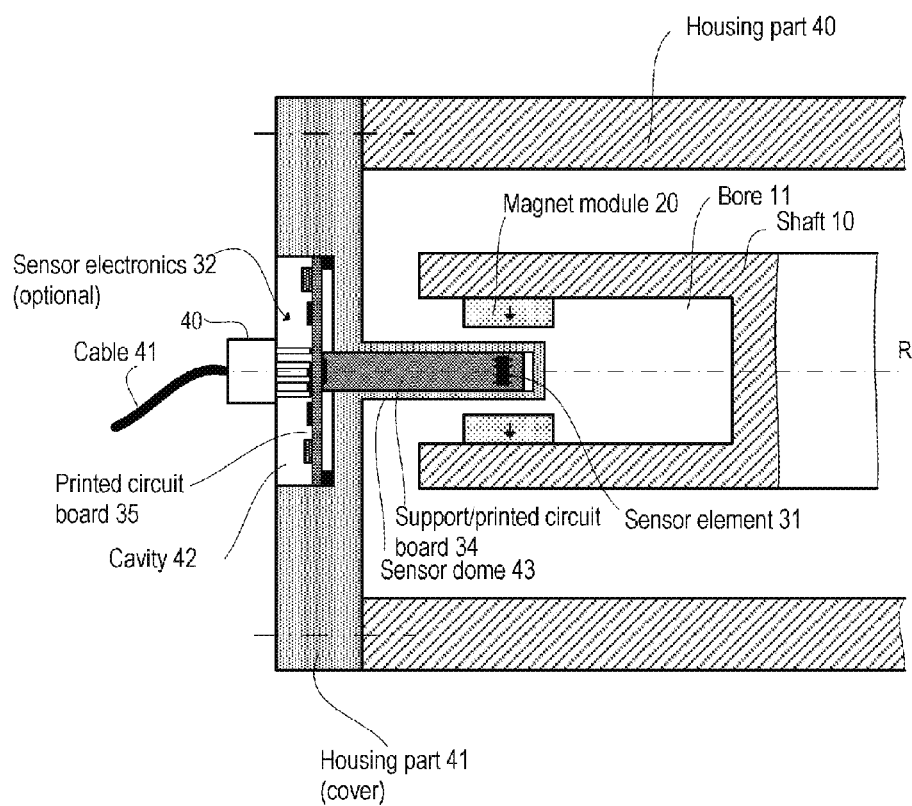
FIG. 3 illustrates an exemplary embodiment with a magnetic sensor which is integrated in a housing cover.

FIG. 3 illustrates an exemplary embodiment of a sensor unit, which is integrated into the motor housing, for measuring the angular position φ of a shaft 10. It should first be noted at this point that the shaft 10 is shown on a relatively large scale in relation to the housing for reasons of simple illustration in FIG. 3. The elements illustrated in FIG. 3 are not true to scale. Similarly to the example from FIG. 1, the shaft 10 has an axial bore 11 along the rotation axis R, and a magnet unit 20 is mounted in the interior of the bore 11, which magnet unit rotates together with the shaft 10 and consequently generates a magnetic field which rotates together with the shaft. The magnet unit 20 comprises at least one permanent magnet which generates, for example, a diametrically running magnetic field (the direction of the field is indicated by the arrows in FIG. 3).

The electric motor is arranged in a first housing part 40 which can be closed by means of a second housing part 41 at the side. The second housing part 41 is referred to as the housing cover below. The housing cover can have a cavity 42 and has an elongate, for example prismatic (or cylindrical) and hollow projection 43 which, when the housing cover 41 is mounted on the housing part 40, extends along the rotation axis into the bore 11. The elongate projection 43 is also referred to as a tower-like element or as a "sensor dome". A support 34 is arranged in the interior of the hollow projection 43, one or more sensor elements 31 being mounted on said support. The sensor elements 31 which are arranged on the support 34 are sensitive to magnetic fields. The support 34 can be a printed circuit board (PCB), a leadframe or the like.

A printed circuit board 35 is arranged in the cavity 42 of the housing cover 41, the sensor electronics 32 being arranged on said printed circuit board. The support 34 is likewise connected to the printed circuit board 35 and therefore renders possible electrical connection of the sensor elements 31 to the sensor electronics 32. The support 34 projects approximately at a right angle from the printed circuit board 35. The sensor electronics 32 are designed to actuate the sensor elements 31 and to process the signals delivered by the sensor elements 31, in order to generate one or more measurement signals which indicates/indicate the angular position or the rotational movement of the shaft 10. Suitable sensor elements, such as Hall sensors or magnetoresistive sensors for example, and also suitable sensor electronics are known per se and will therefore not be discussed further here. The sensor electronics 32 can have a socket with plug contacts in order to be able to connect a cable 41 to the sensor electronics 32 by means of a plug 40. The cable 41 connects (also see FIG. 2) the sensor electronics 32 to an actuation unit 50 for the electric motor.

The elongate projection 43 (the sensor dome) can be an integral constituent part of the housing cover 41. In one example, the elongate projection is fixedly connected to the main part of the housing cover 41 (in which the cavity 43 is located), for example by means of an adhesive or screw connection. Furthermore, the elongate projection 43 and the housing cover 41 can be manufactured from one piece (for example as a plastic injection-molded part).

Figure 4:
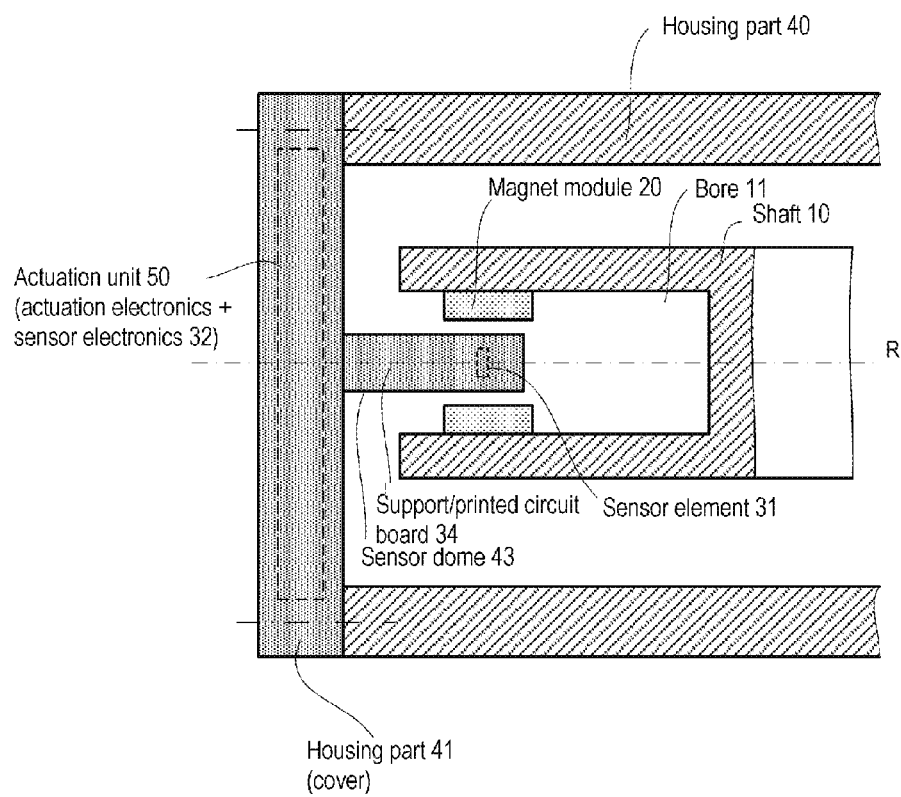
FIG. 4 illustrates an exemplary embodiment similar to that in FIG. 3, but in this case the actuation unit for the electric motor serves as a housing cover, this rendering even more compact construction possible.

FIG. 4 illustrates a further exemplary embodiment which renders it possible to leave out the cable 41 and the associated plug connection between the sensor electronics 32 and the actuation unit 50 for the electric motor M. In this example, the electronics which are used for actuating the electric motor (cf. FIG. 2, actuation unit 50), such as a converter (3-phase inverter) and the like for example, are integrated into the housing part 41, which simultaneously serves as a housing cover, together with the sensor electronics 32 (cf. FIG. 3).

Figure 5:
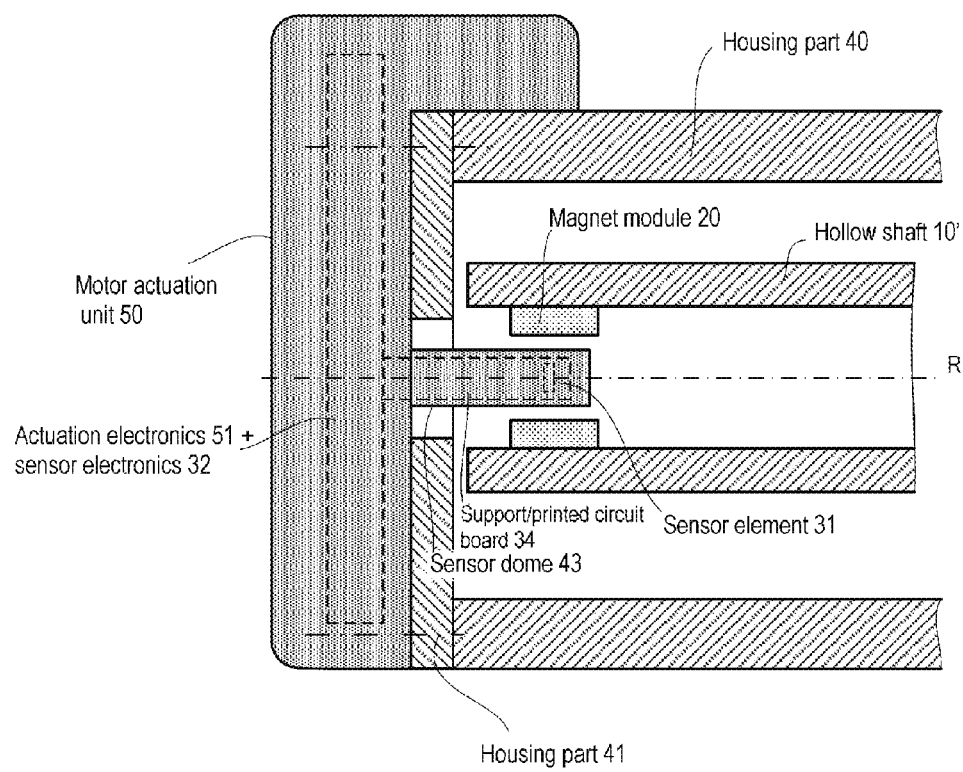
FIG. 5 illustrates a modification to the example from FIG. 4.

The example from FIG. 5 illustrates a modification to the example from FIG. 4 in which the housing part 41 is a conventional housing cover with a central opening. As an alternative, the housing part 41 can also be part of the housing part 40 (motor housing). The actuation unit 50 with the actuation electronics 51 for the electric motor and also the sensor electronics is a module with a separate housing which (as in the previous examples of the housing cover) has a hollow projection 43 which is also referred to as a sensor dome. The projection 43 is a tower-like element in which the sensor element 31 is arranged on a support (similarly to in FIG. 3). In this example too, the actuation electronics 51 for the electric motor and the sensor electronics together with the sensor element 31 are arranged in the same module, and a cable with plug connectors between the sensor electronics and the actuation electronics 51 is not required. The sensor element 31 is (electrically) coupled to the actuation electronics 51 in the interior of the actuation unit 50. In this case, the sensor element can be arranged on a support (for example a mounting board) as is shown in the example from FIG. 3 for example.

Unlike in the previous examples, a hollow shaft 10' is used instead of a shaft with a bore according to FIG. 5. It goes without saying that a hollow shaft can also be used instead of a solid shaft with an axial bore in all other exemplary embodiments described here.

What is claimed is:

1. An apparatus, comprising:
   a first housing part;
   a shaft which is arranged in the first housing part and configured to rotate about a rotation axis, wherein the shaft comprises a bore which extends inwardly in an axial direction along the rotation axis from an end side of the shaft;
   a magnet module comprising at least one permanent magnet that is arranged within the bore and that is fastened to an internal surface of the shaft that defines the bore;
   a second housing part comprising a main body that comprises a first interior cavity that extends lengthwise in a radial direction that is orthogonal to the axial direction, wherein the second housing part further comprises a hollow projection structure that is mechanically coupled to the main body and extends lengthwise in the axial direction along the rotation axis from the main body into the bore, wherein the hollow projection structure includes a second interior cavity that is conjoined with the first interior cavity to form a contiguous interior cavity;

a magnetic field sensor element that is arranged in the second interior cavity of the hollow projection structure;

a sensor circuit board arranged in the first interior cavity of the main body; and a sensor circuit arranged in the first interior cavity and mechanically and electrically coupled to the sensor circuit board, wherein the sensor circuit is further electrically coupled to the magnetic field sensor element for receiving sensor signals therefrom.

2. The apparatus as claimed in claim 1, wherein the hollow projection structure is an integral constituent part of the second housing part.

3. The apparatus as claimed in claim 1, wherein the second housing part forms a housing cover for the first housing part.

4. The apparatus as claimed in claim 1, further comprising:

a support structure arranged in the second interior cavity of the hollow projection structure of the second housing part, wherein the magnetic field sensor element is mounted on the support structure.

5. The apparatus as claimed in claim 1, wherein the second interior cavity extends from the first interior cavity into an interior of the hollow projection structure.

6. The apparatus as claimed in claim 1, further comprising:

an actuator configured to actuate an electric motor, wherein the shaft is the motor shaft of the electric motor and wherein the actuator is arranged in the first interior cavity of the main body of the second housing part.

7. The apparatus as claimed in claim 1, wherein the sensor circuit board extends lengthwise in the radial direction.

8. The apparatus as claimed in claim 1, wherein the contiguous interior cavity has a T-shape.

9. The apparatus as claimed in claim 1, wherein:

the magnetic field sensor element is configured to generate the sensor signals based on a magnetic field generated by the magnet module, and the sensor circuit is configured to receive the sensor signals and generate measurement signals indicative of a rotational parameter of the shaft based on the sensor signals, and wherein the sensor circuit is further configured to actuate the magnetic field sensor element.

10. The apparatus as claimed in claim 1, wherein:

the first housing part includes a third interior cavity in which the shaft and the hollow projection structure are arranged, and the main body of the second housing part is coupled to an end of the first housing part as a housing cover such that the third interior cavity is delineated by an interior side of the main body of the second housing part.

11. The apparatus as claimed in claim 10, wherein the main body and the hollow projection structure are formed as a one-piece integral constituent part.

12. An apparatus, comprising:

a first housing part comprising a first interior cavity;

an electric motor which is arranged in the first interior cavity of the first housing part and has a motor shaft that is configured rotate about a rotation axis, wherein the motor shaft comprises a bore which inwardly extends in an axial direction along the rotation axis from an end side of the shaft;

a magnet module comprising at least one permanent magnet that is arranged within the bore and that is fastened to an internal surface of the shaft that defines the bore;

a second housing part comprising a main body that comprises a second interior cavity that extends lengthwise in a radial direction that is orthogonal to the axial direction, wherein the second housing part further comprises a hollow projection structure that is mechanically coupled to the main body and extends lengthwise in the axial direction along the rotation axis from the main body into the bore, wherein the hollow projection structure includes a third interior cavity that is conjoined with the second interior cavity to form a contiguous interior cavity;

an actuator that is arranged in the second interior cavity of the main body of the second housing part;

an electronic circuit for actuating the electric motor, wherein the electronic circuit is arranged in the actuator; and a magnetic field sensor element arranged in the third interior cavity of the hollow projection structure, wherein the magnetic field sensor element is coupled to the electronic circuit, and wherein the wherein the electronic circuit is further configured to receive sensor signals from the magnetic field sensor element and generate measurement signals indicative of a rotational parameter of the shaft based on the sensor signals.

13. The apparatus as claimed in claim 12, wherein the main body of the second housing part fully closes an end of the first housing part, thereby partially enclosing the first interior cavity and therefore serves as a housing cover.

14. The apparatus as claimed in claim 13, wherein the second housing part is a constituent part of the first housing part.

* * * * *